H. C. BAINES.
SELF PROPELLED AGRICULTURAL IMPLEMENT.
APPLICATION FILED MAY 21, 1920.
1,399,040.
Patented Dec. 6, 1921.
3 SHEETS—SHEET 1.
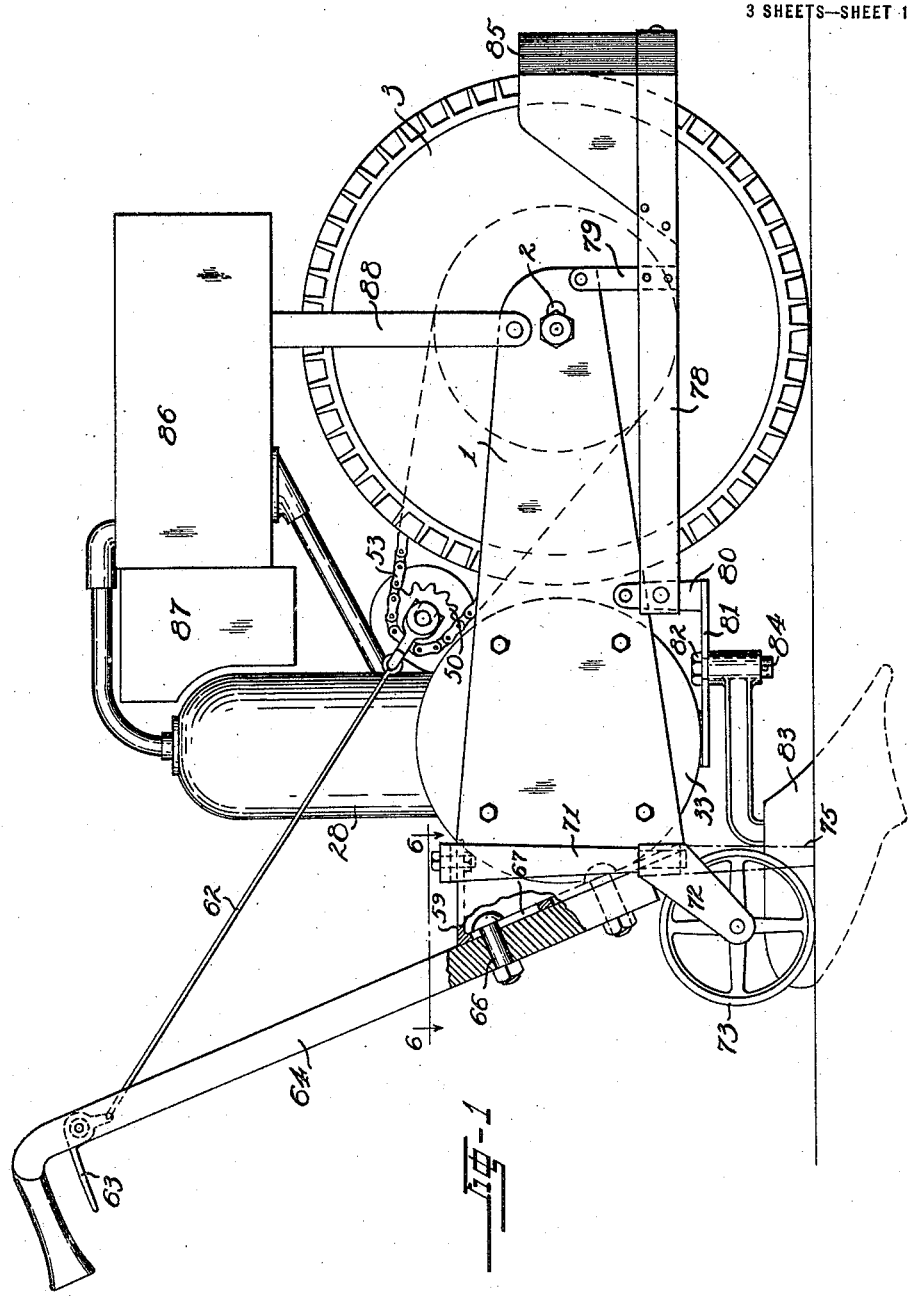

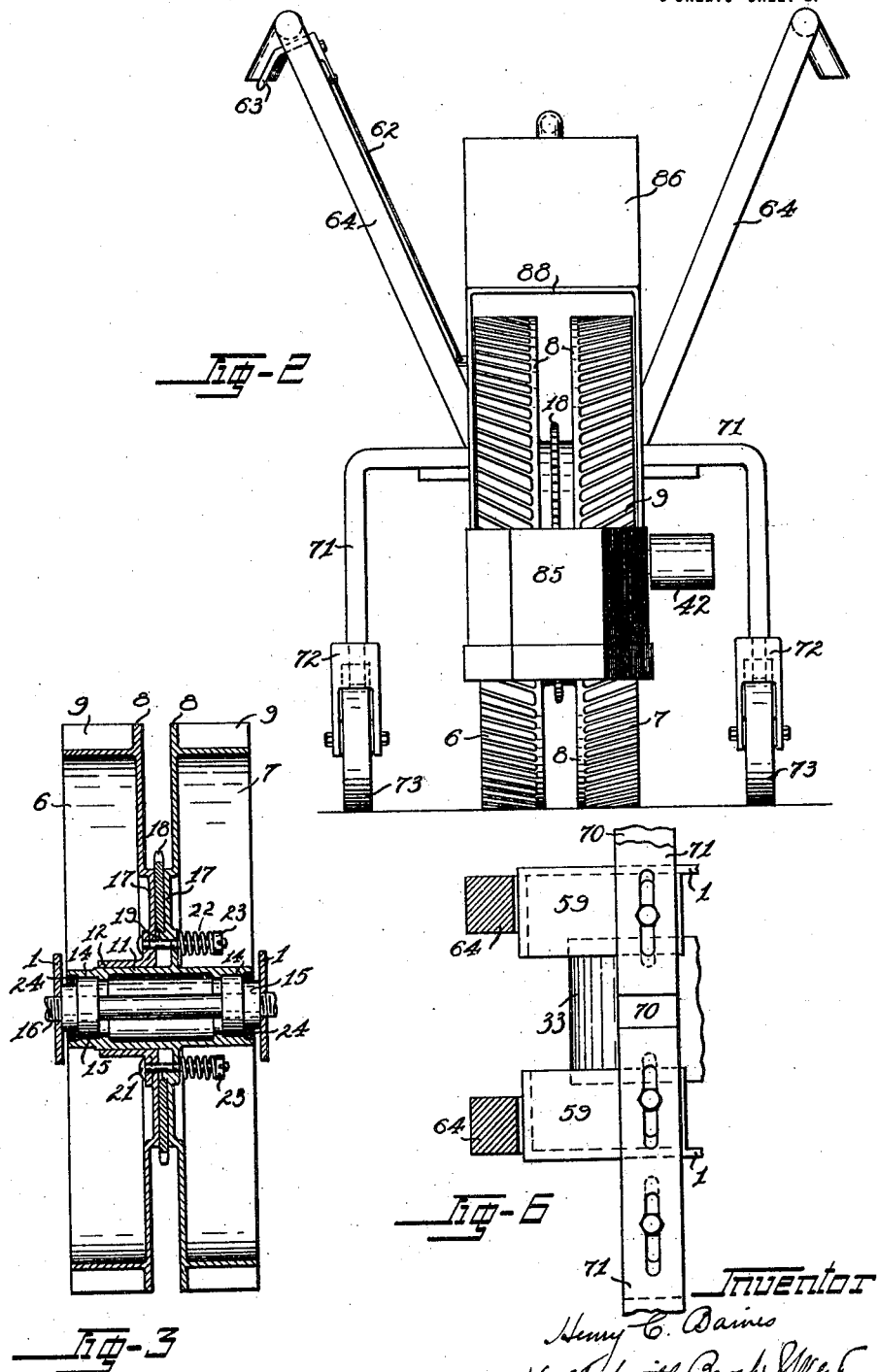

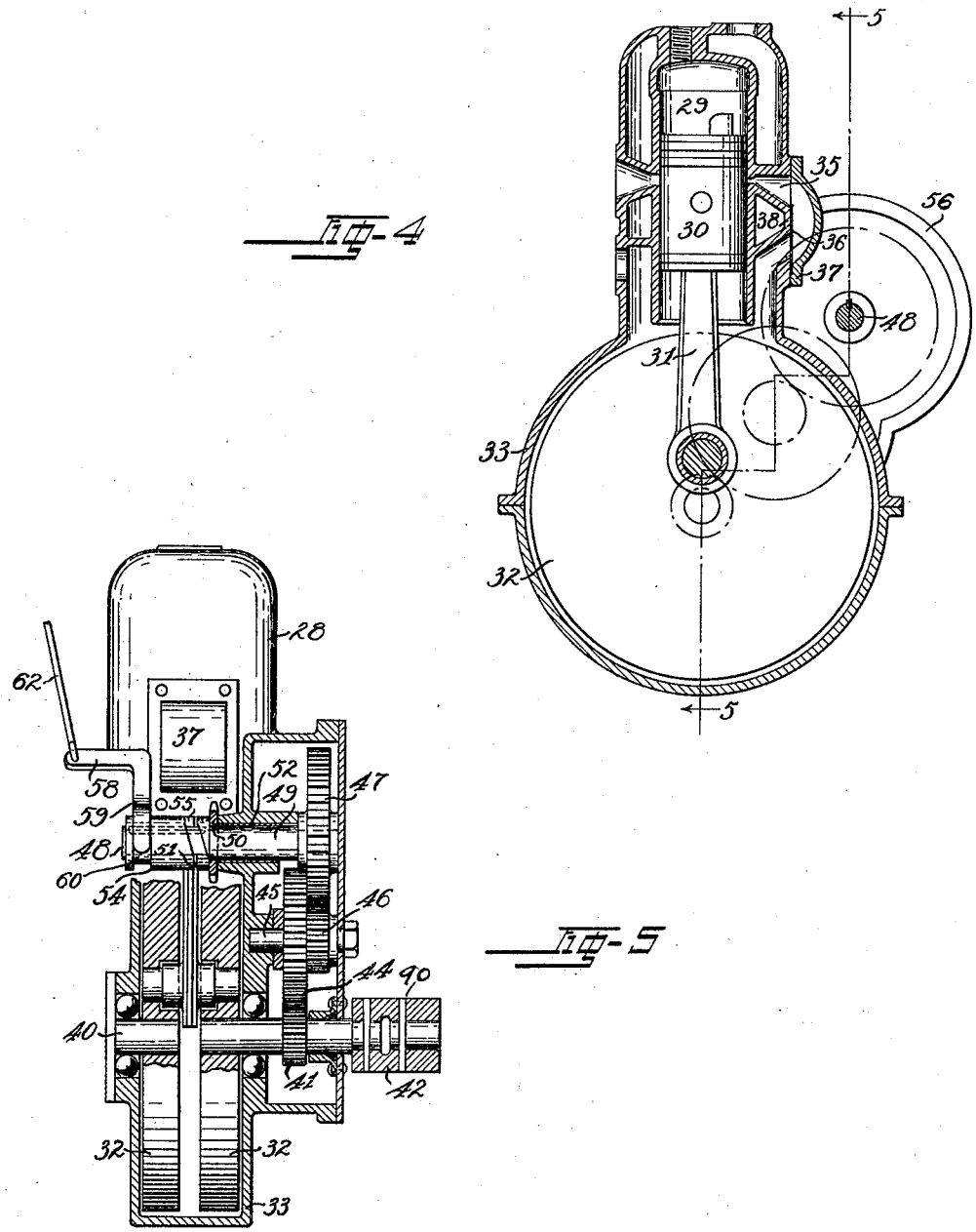

UNITED STATES PATENT OFFICE.

HENRY C. BAINES, OF CLEVELAND, OHIO, ASSIGNOR TO THE BAINES ENGINEERING COMPANY, OF CANAL DOVER, OHIO, A CORPORATION OF OHIO.

SELF-PROPELLED AGRICULTURAL IMPLEMENT.

1,399,040.     Specification of Letters Patent.     Patented Dec. 6, 1921.

Application filed May 21, 1920. Serial No. 383,069.

*To all whom it may concern:*

Be it known that I, HENRY C. BAINES, a subject of King of England, residing at Cleveland, in the county of Cuyahoga and State of Ohio, have invented a certain new and useful Improvement in Self-Propelled Agricultural Implements, of which the following is a full, clear, and exact description, reference being had to the accompanying drawings.

This invention relates to self-propelled agricultural implements and has for its objects to provide a device of this character which shall be particularly adapted for the cultivation of relatively small tracts of land; to provide a device which shall be capable of efficient use in a limited space without damage to the surrounding plants under cultivation; to provide a device which may also be used as a stationary power plant for driving other machines; to provide a device which shall be extremely simple in construction, light in weight and inexpensive to manufacture; while further objects and advantages will appear as the description proceeds.

In the accompanying drawings, wherein I have shown an illustrative embodiment of my invention but without intent to limit myself thereto, Figure 1 is a side elevation of my cultivator; Fig. 2 is a front end view thereof; Fig. 3 is a vertical sectional view through the tractor wheel; Fig. 4 is a vertical sectional view through the means for propelling the vehicle; and Figs. 5 and 6 are sectional views taken on the lines 5—5 and 6—6 of Figs. 4 and 1, respectively.

Describing the various parts by reference characters, 1 indicates a pair of horizontal side plates which are slotted near their forward ends as indicated at 2 to adjustably receive a tractor wheel 3. As shown in Figs. 2 and 3, the tractor wheel 3 is composed of two circular tractor elements 6 and 7, each of which is shrouded or flanged, about its inner circumferential edge as indicated at 8. Suitable traction lugs 9 are disposed at an angle to said shrouds and preferably incline rearwardly thereto to form a series of V's, so that the vertices thereof will engage the ground first and throw the dirt outwardly. The tractor element 7 is provided with a hub projection 11 which extends through an enlarged hub 12 on the tractor element 6, said projection being formed at each end with suitable seats 14—14 to receive the anti-friction bearings 15—15 which rotatably support the wheel on an axle 16. The inner faces of tractor elements 6 and 7 are formed with opposed offset circular portions 17—17 which frictionally clamp a sprocket wheel 18 therebetween, the circular portion of element 7 being provided with a boss 19 for the centering of said sprocket. The tractor elements 6 and 7 are yieldingly clamped together by bolts 21 passing therethrough, at a point inwardly of the sprocket wheel 18 and each bolt is provided with a spring 22 interposed between a nut 23 threaded thereon, and the tractor element. A washer 24 of felt or other suitable material is interposed between the side plates 1 and the bearings 15 to exclude dust and dirt from the parts.

The source of power for the tractor wheel 2 is preferably in the form of a two-cycle internal combustion engine 28 which is provided with a cylinder 29 and piston 30 which is connected by a connecting rod 31 to a fly wheel 32 journaled in the crank case 33. As shown in Fig. 4 the intake by-pass 35 which communicates with the cylinder and the crank case is fitted with a reed 36 which is clamped at its lower end between the cylinder wall and the cover plate 37. At its upper end the reed abuts a projection 38 and the sides thereof abut the side faces of the intake passage, thus functioning as a flap valve for the intake by-pass. It will thus be apparent that the explosive mixture can enter the cylinder in the usual manner, but if a back-fire should occur, the back pressure therefrom will force the reed against the projection and close the passage, thereby preventing ignition of the mixture in the crank case.

The crank shaft 40 has mounted thereon a drive pinion 41, and a suitable pulley 42, the latter serving as a convenient means for utilizing the engine as a source of power for driving other machines. The pinion 41 meshes with a gear 44 which is journaled on a stud shaft 45 and said gear is rotatable with a pinion 46, also journaled thereon. Pinion 46 meshes with a gear 47 which is secured to the clutch shaft 48, said shaft having journaled thereon a sleeve 49 which mounts a drive sprocket 50 intermediate of the cam clutch 51 and the bearing 52. The transmission or reduction gearing is preferably inclosed in a casing 56 so that dust and dirt may be excluded therefrom and lubricant retained about the parts. The sprocket 50 is disposed in longitudinal aline-ment with the sprocket wheel 18 and a chain 53 connects said members and serves to transmit power from the engine to the tractor wheel. The engaging member of the clutch comprises a sleeve 54 which is splined on the clutch shaft 48 and provided with a coöperating cam clutch face 55 which is adapted to engage the cam head 51 and drive the sprocket 50. Movement of the sleeve 54 to engage and disengage the clutch is accomplished by means of a pivoted bell-crank 58 which is provided with a forked arm 59 engaging a groove 60 in said sleeve. The other arm 61 of the bell-crank, is connected by a link 62 to a hand lever 63 which is pivotally mounted on one of the guiding handles 64—64.

The rear ends of the side plates 1 are turned inwardly and inclined upwardly to form angularly disposed clamping members for the handle 64—64, which are adjustably clamped thereto by bolts 66 engaging slots 67 formed in the end of the plates. The top surfaces of the plates 1 adjacent the rear end thereof are also bent inwardly as indicated at 59 to form a clamping surface for the transverse tie plate 70, to which, are adjustably clamped the stabilizing arms 71, 71. The depending ends of said arms are provided each with a pivoted yoke 72 which rotatably supports a caster wheel 73. A pair of supporting legs 75, 75, as indicated by the dot and dash lines in Fig. 1, are interchangeable with the yoke 71, 71 when it is desired to use the engine as a stationary power plant.

A U-shaped guard frame 78 surrounds the tractor wheel and is suspended from the side plates 1 at the forward end by the strap 79 and at the rear end by a transverse U-shaped bracket 80, the latter being fastened to an arm 81 which projects from the lower part of the crank case 33. The arm 81 is provided with a pin 82 which forms a pivotal connection for an agricultural implement, such as the plow 83 shown in Fig. 1, which is retained thereon in any suitable manner as by a pin indicated at 84. A shield 85 rising from the forward end of the frame 78 serves to spread the crop as the machine is advanced therethrough thus preventing the plants under cultivation from becoming entangled with the tractor wheel or damaged thereby. Suitable tanks for water and gasolene, as shown at 86 and 87, may be supported above the main frame 1 by a U-shaped support 88.

When using the device for cultivation purposes, the stabilizers are adjusted to a width to permit the wheels 73 to pass between crop rows. A suitable agricultural implement is fastened to the arm 81 and the handles 64—64 are adjusted to a convenient height for the operator. The engine is cranked by inserting a starting lever (not shown) in the hub of the pulley 42 and engaging the pin 90. Engagement of the clutch is accomplished by the hand lever 63, the impact of such engagement being relieved by the sprocket gear 18 slipping between the yieldingly clamped tractor elements 6 and 7. When using the lever as a stationary power plant, the caster wheel yokes 72 are removed and the supporting legs previously described are substituted therefor.

Having thus described my invention, what I claim is:

1. In a self propelled vehicle of the class described, the combination with a frame, of a single tractor wheel mounted adjacent one end of said frame, said wheel being composed of two interfitting traction members yieldingly clamped together, a power transmitting element frictionally held between said members, an internal combustion engine mounted on said frame and operatively connected to said power transmitting element, a pair of laterally spaced wheels supporting the end of said frame opposite said tractor wheel, means for adjusting said wheels laterally, and means for steering said vehicle.

2. In a self propelled vehicle of the class described, the combination with a frame, of a single tractor wheel mounted adjacent one end of said frame, said wheel being composed of two interfitting traction members yieldingly clamped together, a power transmitting element frictionally held between said members, an internal combustion engine mounted on said frame and operatively connected to said power transmitting element, a pair of laterally spaced and pivotally mounted wheels supporting the end of said frame opposite said tractor wheel, means for adjusting said wheels laterally, and a pair of handles attached to said frame for steering said vehicle.

3. In a self propelled vehicle of the class described, the combination with a wheel supported frame involving a single tractor wheel composed of two interfitting traction members, of a power transmitting element interposed between said members, an internal combustion engine mounted on said frame, driving connections between said engine and said element, a clutch interposed in said driving connections and means for yieldingly clamping said traction members and said power transmitting element whereby the impact of the engagement of said clutch is absorbed.

4. In a device of the class described, the combination with a frame, of a single tractor wheel mounted adjacent one end of said frame, said wheel being composed of two traction members yieldingly clamped together, a power transmitting element interposed between said members and frictionally clamped therebetween, an internal combustion engine mounted on said frame, driving connections between said engine and said power transmitting element, and means for supporting the end of said frame opposite said tractor wheel.

5. In a device of the class described, the combination with a frame, of a single tractor wheel mounted adjacent one end of said frame, said wheel being composed of two interfitting traction members yieldingly clamped together, a power transmitting element interposed between said members and frictionally clamped therebetween, an internal combustion engine mounted on said frame, driving mechanism including a clutch connecting said engine and said power transmitting element, a pair of laterally spaced and pivotally mounted wheels for supporting the end of said frame opposite said tractor wheel, and a pair of handles attached to said frame for steering said vehicle.

6. In a self propelled vehicle of the class described, the combination with a wheel supported frame, of an internal combustion engine mounted on said frame, driving connections between said engine and one of said wheels for propelling said vehicle, said driving wheel being composed of traction members yieldingly clamped together, and a power transmitting element frictionally held between said members, said power transmitting element forming a part of said driving connections.

7. In a self propelled vehicle of the class described, the combination with a frame, of a tractor wheel journaled in said frame, said wheel being composed of tractor members yieldingly clamped together and a power transmitting element interposed between said members, an internal combustion engine mounted on said frame, and driving connections between said engine and said power transmitting element.

8. In a self propelled vehicle of the class described, the combination with a frame, of a tractor wheel rotatably mounted in said frame, said tractor wheel being composed of two interfitting traction members yieldingly clamped together and a power transmitting element frictionally clamped between said members, an internal combustion engine mounted on said frame, and driving connections between said engine and said power transmitting element.

9. In a self propelled vehicle of the class described, the combination with a frame, of a tractor wheel rotatably mounted on said frame, said tractor wheel being composed of a traction member having a hub projection, a second traction member mounted on said hub projection, means for yieldingly clamping said members together, a power transmitting element frictionally clamped between said members, an internal combustion engine mounted on said frame, and driving connections between said engine and said power transmitting element.

In testimony whereof, I hereunto affix my signature.

HENRY C. BAINES.